(12) United States Patent
Siekman et al.

(10) Patent No.: US 12,711,961 B2
(45) Date of Patent: Aug. 18, 2026

(54) SYSTEM AND METHOD FOR DIGITAL VOICE DATA PROCESSING AND AUTHENTICATION

(71) Applicant: BANK OF AMERICA CORPORATION, Charlotte, NC (US)

(72) Inventors: James J. Siekman, Charlotte, NC (US); Tomas M. Castrejon, III, Fort Mill, SC (US); Sanjay Arjun Lohar, Charlotte, NC (US); Kyle Mayers, Charlotte, NC (US); Karen Stanek McFeeters, York, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 337 days.

(21) Appl. No.: 18/130,216

(22) Filed: Apr. 3, 2023

(65) Prior Publication Data

US 2024/0331707 A1 Oct. 3, 2024

(51) Int. Cl.
*G10L 17/06* (2013.01)
*G10L 17/02* (2013.01)
(Continued)

(52) U.S. Cl.
CPC .............. *G10L 17/06* (2013.01); *G10L 17/02* (2013.01); *G10L 17/04* (2013.01); *G10L 17/24* (2013.01); *G10L 25/18* (2013.01)

(58) Field of Classification Search
None
See application file for complete search history.

(56) References Cited

U.S. PATENT DOCUMENTS 7,627,477 B2 * 12/2009 Wang ...................... G10L 15/10 341/110
8,762,143 B2 6/2014 Gilbert
(Continued)

OTHER PUBLICATIONS

Jaiyen et al. "Real-Time Audio Similarity Comparison Algorithm." IEEE, Mar. 1, 2018, https://ieeexplore.ieee.org/abstract/document/8305436. Accessed May 1, 2025. (Year: 2018).*
(Continued)

*Primary Examiner* — Hai Phan
*Assistant Examiner* — Jon Christopher Meis
(74) *Attorney, Agent, or Firm* — Moore & Van Allen PLLC; Nicholas C. Russell

(57) ABSTRACT

Systems, computer program products, and methods are described herein for digital voice data processing and authentication. The present invention is configured to receive a user interaction comprising a digital audio signal and capture a first audio segment and a second audio segment of the digital audio signal. The first audio segment and the second audio segment are plotted into corresponding first and second plots. The first and second plots are compared, wherein comparing comprises subtracting the first plot from the second plot to form a difference plot. A quantity of outlier peaks is determined, then an artificial user probability is assigned to the user interaction, wherein the artificial user probability is low if the quantity of outlier peaks is greater than a predetermined outlier peak threshold. The artificial user probability is then displayed on a user interface of an endpoint device.

15 Claims, 6 Drawing Sheets

300

RECEIVE A USER INTERACTION COMPRISING A DIGITAL AUDIO SIGNAL
302

CAPTURE A FIRST AUDIO SEGMENT AND A SECOND AUDIO SEGMENT OF THE DIGITAL AUDIO SIGNAL
304

PLOT THE FIRST AUDIO SEGMENT AND THE SECOND AUDIO SEGMENT INTO CORRESPONDING FIRST AND SECOND PLOTS, WHEREIN A PLOT TYPE OF THE FIRST AND SECOND PLOTS IS AT LEAST ONE SELECTED FROM GROUP CONSISTING OF: TIME-DOMAIN WAVEFORMS, FREQUENCY-DOMAIN WAVEFORMS, AND SPECTROGRAMS
306

COMPARE THE FIRST AND SECOND PLOTS, WHEREIN COMPARING COMPRISES SUBTRACTING THE FIRST PLOT FROM THE SECOND PLOT TO FORM A DIFFERENCE PLOT
308

DETERMINE A QUANTITY OF OUTLIER PEAKS, WHEREIN THE OUTLIER PEAKS COMPRISE PEAKS OF THE DIFFERENCE PLOT ABOVE AN UPPER PREDETERMINED THRESHOLD OR BELOW A LOWER PREDETERMINED THRESHOLD
310

ASSIGN AN ARTIFICIAL USER PROBABILITY TO THE USER INTERACTION, WHEREIN THE ARTIFICIAL USER PROBABILITY IS LOW IF THE QUANTITY OF OUTLIER PEAKS IS GREATER THAN A PREDETERMINED OUTLIER PEAK THRESHOLD
312

DISPLAY THE ARTIFICIAL USER PROBABILITY ON A USER INTERFACE OF AN ENDPOINT DEVICE
314

(51) Int. Cl.

| | |
|---|---|
| ***G10L 17/04*** | (2013.01) |
| ***G10L 17/24*** | (2013.01) |
| ***G10L 25/18*** | (2013.01) |

(56) References Cited

U.S. PATENT DOCUMENTS

| | | | |
|---|---|---|---|
| 9,697,822 B1 | 7/2017 | Naik et al. | |
| 10,170,137 B2 | 1/2019 | Bastian et al. | |
| 10,388,283 B2 | 8/2019 | Vachhani et al. | |
| 11,282,524 B2 | 3/2022 | Dube | |
| 11,295,726 B2 | 4/2022 | Thotempudi et al. | |
| 11,475,881 B2 | 10/2022 | Mandal et al. | |
| 11,495,210 B2 | 11/2022 | Li et al. | |
| 11,508,388 B1 | 11/2022 | Souden et al. | |
| 11,551,695 B1 | 1/2023 | Guo et al. | |
| 2010/0131279 A1* | 5/2010 | Pilz | H04L 63/0861 726/28 |
| 2020/0294510 A1 | 9/2020 | Khoury et al. | |
| 2021/0192332 A1 | 6/2021 | Gangotri et al. | |
| 2021/0358503 A1* | 11/2021 | Keret | G10L 17/06 |
| 2022/0084543 A1 | 3/2022 | Sinha et al. | |
| 2022/0301548 A1 | 9/2022 | Wintrode | |
| 2022/0343898 A1 | 10/2022 | Fu | |
| 2022/0358934 A1* | 11/2022 | Wang | G10L 17/06 |
| 2023/0008822 A1 | 1/2023 | Serban | |
| 2023/0015189 A1 | 1/2023 | Looney et al. | |

OTHER PUBLICATIONS

SciPy "find_peaks." SciPy, Oct. 13, 2022, https://docs.scipy.org/doc/scipy/reference/generated/scipy.signal.find_peaks.html. Accessed May 1, 2025 via archive.org: https://web.archive.org/web/20221013141023/https://docs.scipy.org/doc/scipy/reference/generated/scipy.signal.find_peaks.html. (Year: 2022).*

Dizon, "A Data Scientist's Approach to Visual Audio Comparison." Medium, Jul. 26, 2019, https://medium.com/data-science/a-data-scientists-approach-to-visual-audio-comparison-fa15a5d3dcef. Accessed Aug. 21, 2025. (Year: 2019).*

James, "How to quantify spectrogram comparison." Matlab Help Center, Jan. 5, 2017. Accessed Aug. 21, 2025. (Year: 2017).*

Marius, "Experimenting with acoustic fingerprinting for duplicate detection." AugmentedMind, Feb. 14, 2021, https://www.augmentedmind.de/2021/02/14/acoustic-fingerprinting-experiment/. Accessed via archive.org. (Year: 2021).*

* cited by examiner

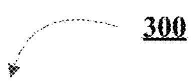

RECEIVE A USER INTERACTION COMPRISING A DIGITAL AUDIO SIGNAL
302

CAPTURE A FIRST AUDIO SEGMENT AND A SECOND AUDIO SEGMENT OF THE DIGITAL AUDIO SIGNAL
304

PLOT THE FIRST AUDIO SEGMENT AND THE SECOND AUDIO SEGMENT INTO CORRESPONDING FIRST AND SECOND PLOTS, WHEREIN A PLOT TYPE OF THE FIRST AND SECOND PLOTS IS AT LEAST ONE SELECTED FROM GROUP CONSISTING OF: TIME-DOMAIN WAVEFORMS, FREQUENCY-DOMAIN WAVEFORMS, AND SPECTROGRAMS
306

COMPARE THE FIRST AND SECOND PLOTS, WHEREIN COMPARING COMPRISES SUBTRACTING THE FIRST PLOT FROM THE SECOND PLOT TO FORM A DIFFERENCE PLOT
308

DETERMINE A QUANTITY OF OUTLIER PEAKS, WHEREIN THE OUTLIER PEAKS COMPRISE PEAKS OF THE DIFFERENCE PLOT ABOVE AN UPPER PREDETERMINED THRESHOLD OR BELOW A LOWER PREDETERMINED THRESHOLD
310

ASSIGN AN ARTIFICIAL USER PROBABILITY TO THE USER INTERACTION, WHEREIN THE ARTIFICIAL USER PROBABILITY IS LOW IF THE QUANTITY OF OUTLIER PEAKS IS GREATER THAN A PREDETERMINED OUTLIER PEAK THRESHOLD
312

DISPLAY THE ARTIFICIAL USER PROBABILITY ON A USER INTERFACE OF AN ENDPOINT DEVICE
314

FIG. 3

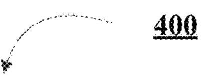

RECEIVE A USER INTERACTION COMPRISING A DIGITAL AUDIO SIGNAL
402

CAPTURE A FIRST AUDIO SEGMENT AND A SECOND AUDIO SEGMENT OF THE DIGITAL AUDIO SIGNAL
404

PLOT A SPECTROGRAM FOR AT LEAST ONE OF THE FIRST AUDIO SEGMENT AND THE SECOND AUDIO SEGMENT
406

QUERY A MACHINE LEARNING ENGINE TO DETERMINE IF THE SPECTROGRAM FOR EACH OF THE FIRST AUDIO SEGMENT OR THE SECOND AUDIO SEGMENT IS IDENTICAL TO KNOWN SPECTROGRAMS
408

FIG. 4

SYSTEM AND METHOD FOR DIGITAL VOICE DATA PROCESSING AND AUTHENTICATION

FIELD OF THE INVENTION

The present invention embraces a system for digital voice data processing and authentication.

BACKGROUND

Oftentimes, users associated with an entity interact with customers of the entity's products and services by using verbal communications transmitted through telephone or VoIP. Presently, however, the use of artificial intelligence and natural language processing engines to create audio mimicking human voices is prevalent, leading to difficulties in identifying differences between true human customers and those who use artificial intelligence to mimic a human, potentially to maliciously interact with the entity. Accordingly, there is a need for a system and method for digital voice data processing and authentication.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for digital voice data processing and authentication is presented. The system may include at least one non-transitory storage device and at least one processing device coupled to the at least one non-transitory storage device, wherein the at least one processing device is configured to receive a user interaction comprising a digital audio signal, capture a first audio segment and a second audio segment of the digital audio signal, plot the first audio segment and the second audio segment into corresponding first and second plots, wherein a plot type of the first and second plots is at least one selected from group consisting of: time-domain waveforms, frequency-domain waveforms, and spectrograms, compare the first and second plots, wherein comparing comprises subtracting the first plot from the second plot to form a difference plot, determine a quantity of outlier peaks, wherein the outlier peaks comprise peaks of the difference plot above an upper predetermined threshold or below a lower predetermined threshold, assign an artificial user probability to the user interaction, wherein the artificial user probability is low if the quantity of outlier peaks is greater than a predetermined outlier peak threshold, and display the artificial user probability on a user interface of an endpoint device.

In some embodiments, the first audio segment is received subsequent a first word prompt provided to a user, wherein the second audio segment is provided in response to a second word prompt provided to a user, and wherein the first word prompt and the second word prompts are identical.

In some embodiments, the first audio segment is a first word, and wherein the second audio segment is a second word determined by a language processing engine to be identical to the first word.

In some embodiments, the first audio segment and the second audio segment are captures of space between words.

In some embodiments, the first audio segment and the second audio segment are captured in real-time from a singular audio source.

In some embodiments, the artificial user probability is high, at least one of a spectrogram of the first audio segment and a spectrogram of the second audio segment is transmitted to a machine learning subsystem as training data.

In some embodiments, the at least one processing device is further configured to query the machine learning subsystem, prior to comparing the first and second plots, to determine if the spectrogram is identical to a known spectrogram, and terminate the user interaction if the spectrogram is identical.

In another aspect, a computer program product for digital voice data processing and authentication is presented. The computer program product may include a non-transitory computer-readable medium comprising code causing a first apparatus to receive a user interaction comprising a digital audio signal, capture a first audio segment and a second audio segment of the digital audio signal, plot the first audio segment and the second audio segment into corresponding first and second plots, wherein a plot type of the first and second plots is at least one selected from group consisting of: time-domain waveforms, frequency-domain waveforms, and spectrograms, compare the first and second plots, wherein comparing comprises subtracting the first plot from the second plot to form a difference plot, determine a quantity of outlier peaks, wherein the outlier peaks comprise peaks of the difference plot above an upper predetermined threshold or below a lower predetermined threshold, assign an artificial user probability to the user interaction, wherein the artificial user probability is low if the quantity of outlier peaks is greater than a predetermined outlier peak threshold, and display the artificial user probability on a user interface of an endpoint device.

In yet another aspect, a method for digital voice data processing and authentication is presented. The method may include receiving a user interaction comprising a digital audio signal, capture a first audio segment and a second audio segment of the digital audio signal, plotting the first audio segment and the second audio segment into corresponding first and second plots, wherein a plot type of the first and second plots is at least one selected from group consisting of: time-domain waveforms, frequency-domain waveforms, and spectrograms, comparing the first and second plots, wherein comparing comprises subtracting the first plot from the second plot to form a difference plot, determining a quantity of outlier peaks, wherein the outlier peaks comprise peaks of the difference plot above an upper predetermined threshold or below a lower predetermined threshold, assigning an artificial user probability to the user interaction, wherein the artificial user probability is low if the quantity of outlier peaks is greater than a predetermined outlier peak threshold, and displaying the artificial user probability on a user interface of an endpoint device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
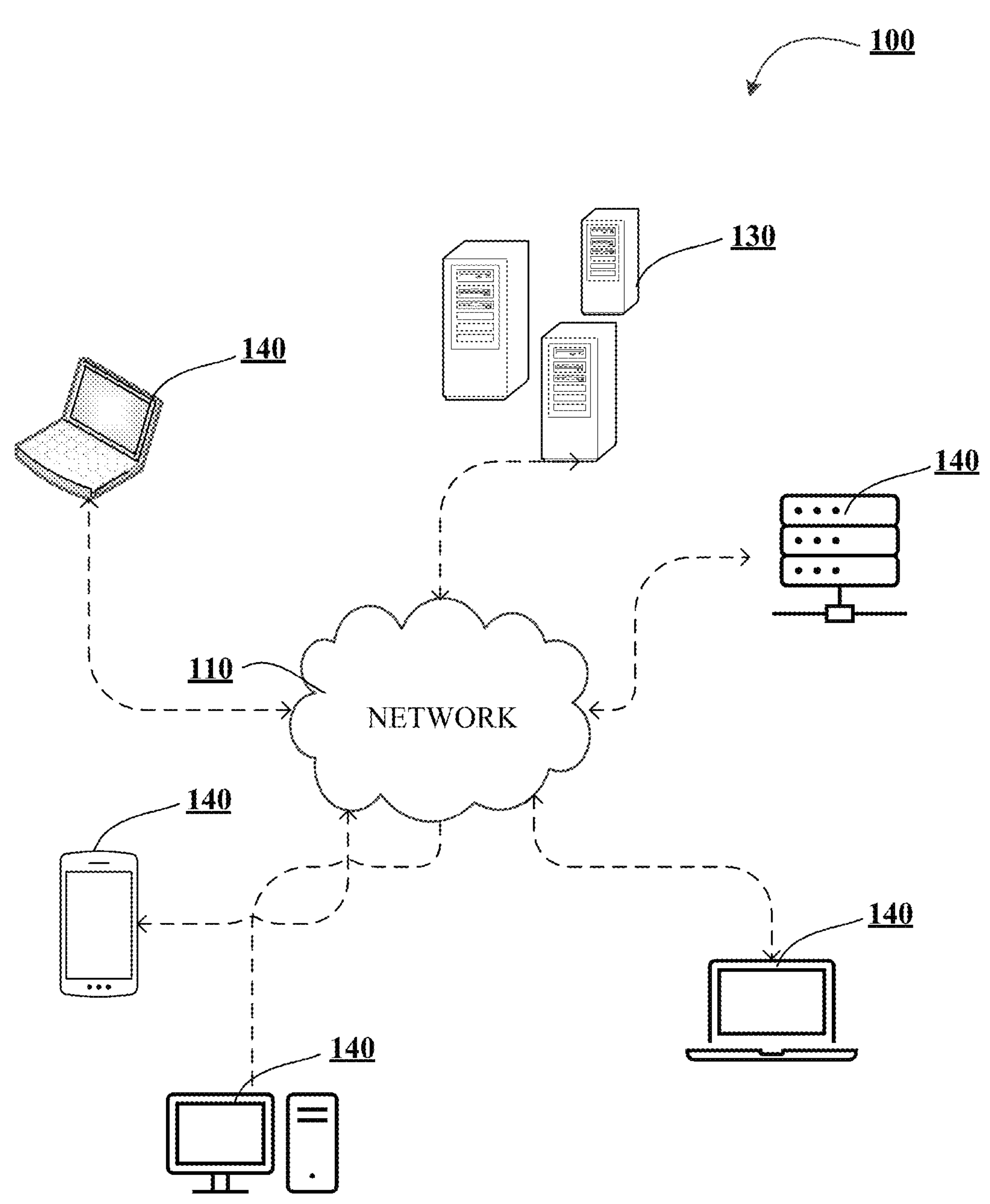
Figure 1B:
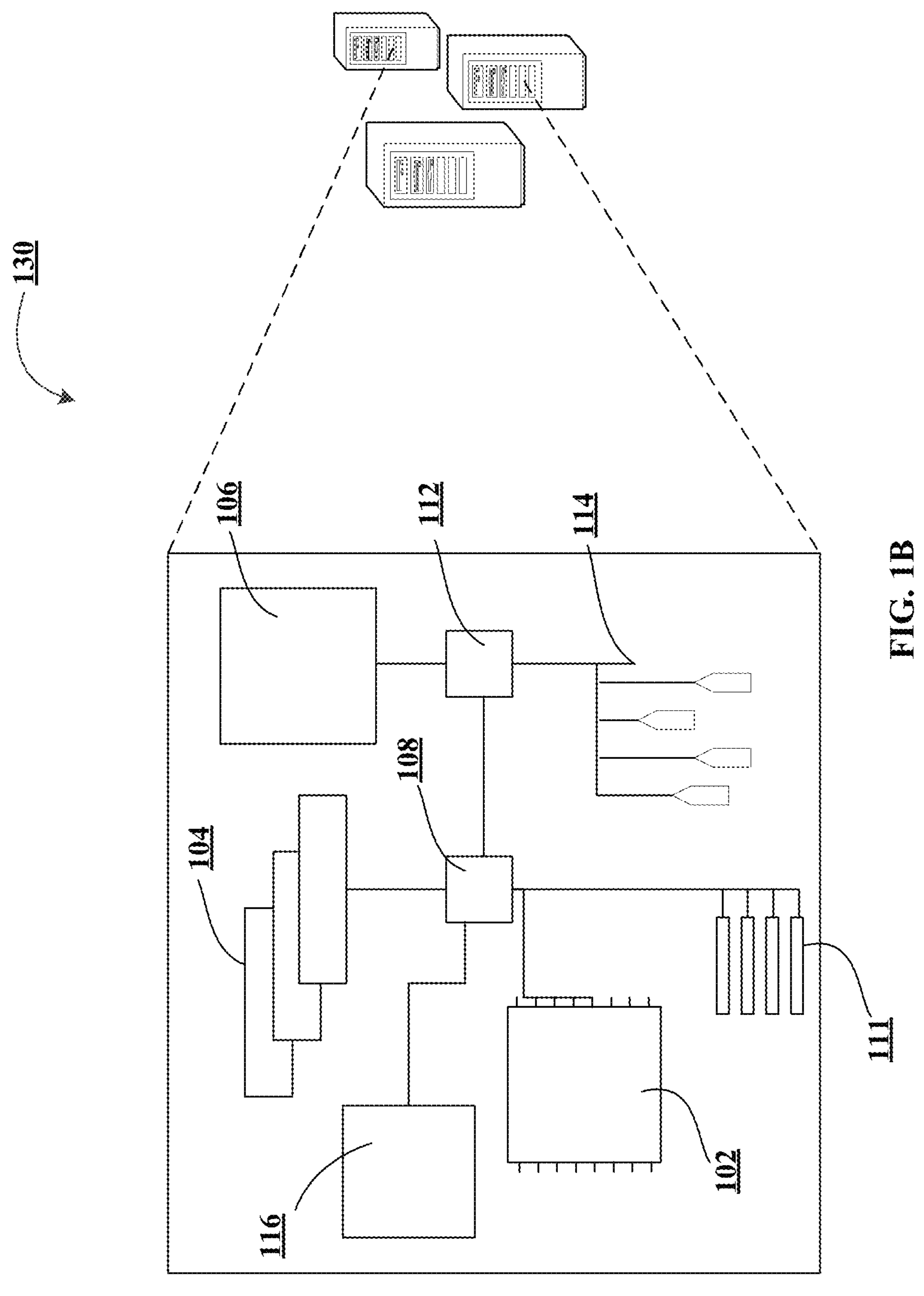
Figure 1C:
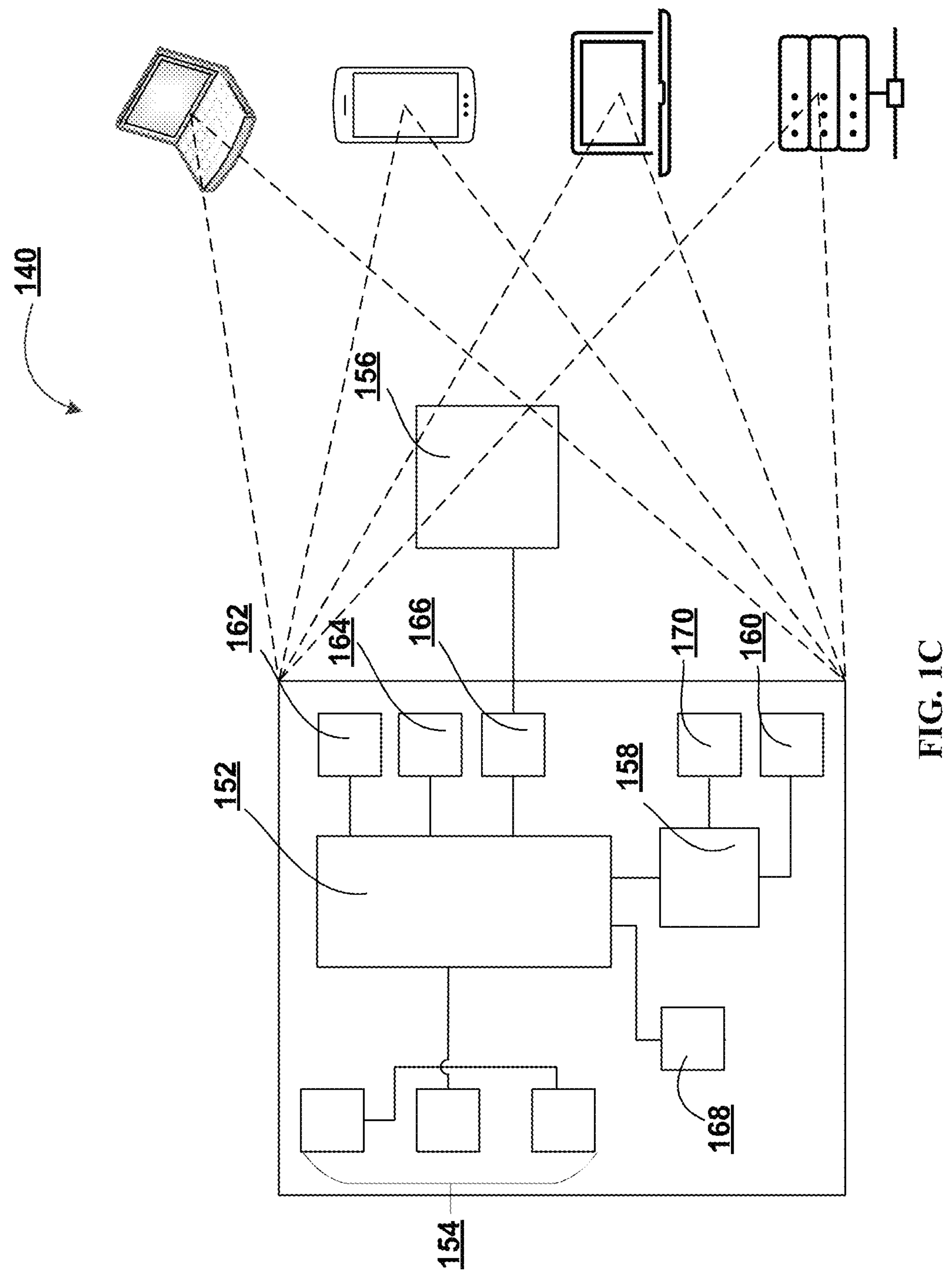
Figure 2:
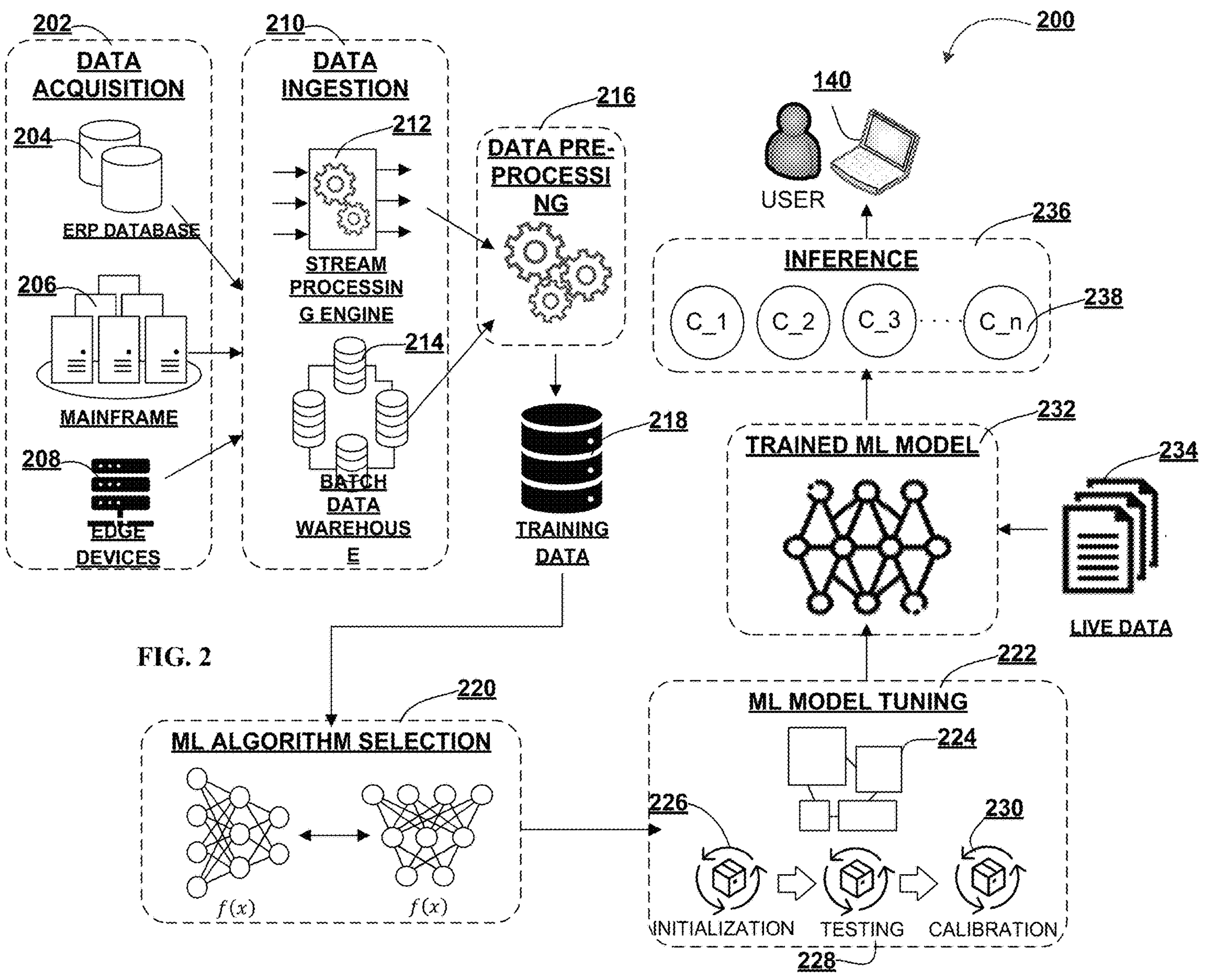

Having thus described embodiments of the invention in general terms, reference will now be made the accompanying drawings, wherein:

FIGS. 1A-1C illustrate technical components of an exemplary distributed computing environment for digital voice data processing and authentication, in accordance with an embodiment of the invention;

FIG. 2 illustrates an exemplary machine learning subsystem architecture, in accordance with an embodiment of the invention;

FIG. 3 illustrates a process flow for digital voice data processing and authentication, in accordance with an embodiment of the invention; and FIG. 4 illustrates a process flow for digital voice data processing and authentication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

The technology described herein implements a digital signal processing approach in conjunction with an automated prompt system to determine the authenticity of a user interacting with an entity, such as an interacting user to a service center of the entity. The system, process, and computer program products described herein provide a user associated with an entity an indication of the probability that an interacting user is not actually a human, but rather an artificial user implementing sophisticated text-to-voice techniques to attempt malfeasant inquiries and interactions with the entity.

Prior to the invention described herein, users associated with entities were subject to the potential of malfeasant actors obfuscating themselves behind one or more layers of computers, artificial intelligence algorithms, and/or computer-generated voices to perpetuate illicit activities. The malfeasant actors portray themselves as humans to gain the trust of users associated with the entity, while also implementing the aforementioned computer methodologies in sophisticated operations in pursuit of nefarious gains. For example, these malfeasant actors often attempt to mine entities for personal information through asking a series of questions, falsely misidentifying themselves to obtain access to restricted accounts, or the like.

The invention disclosed herein provides a system, method, and computer program product that may analyze voice data through digital audio processing techniques, where the voice data is extracted, in real time or in a time-delayed manner, from interactions between users associated with the entity and interacting users in communication with those users associated with the entity. To determine the artificiality of the interacting user, the system may extract two segments of voice data to compare to each other. The extracted voice data is then plotted, transformed, and analyzed for inconsistencies between the two segments of voice data. Based on the number of inconsistences, a prediction as to whether or not the interacting user is a human user or an artificial user is transmitted to a user interface of an endpoint device, where the user associated with the entity is presented with the prediction.

Accordingly, the present disclosure provides for the digital voice data processing and authentication. An interaction with a user containing a digital audio signal is captured. Two audio segments are identified. The first and second audio segments are plotted, where the plots may be time-domain waveforms or frequency-domain waveforms, so long as they are the same type for both the first and second plots. The plots are then compared by subtracting one from the other. Based on a calculation of where localized peaks are in this resulting plot, and comparing the location of these localized peaks to a predetermined threshold, a number of outlier peaks is determined. If the quantity of outlier peaks is above a certain predetermined outlier peak threshold, the probability of the interacting user being an artificial user is determined to be low, and vice-versa. Thereafter, a notification may be transmitter to an endpoint device, where the notification is displayed containing the probability of the interacting user being artificial.

What is more, the present invention provides a technical solution to a technical problem. As described herein, the technical problem includes the inability for digital voice data systems to process incoming voice data in a manner that assists entities in determining whether the user is an authentic user or an artificial user. The technical solution presented herein allows for the comparison of two audio segments that represent slight variations of each other under normal human conditions, and very little or no variation of each other when set forth by an artificial user, to indicate to a user associated with the entity the probability that an interacting user is human or artificial. In particular, the system is an improvement over existing digital voice processing systems by providing verification of the authenticity of an interacting user (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for digital voice data processing and authentication, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for digital voice data processing and authentication, in accordance with an embodiment of the invention. The process may begin at block 302. As shown in block 302, the process flow may begin where the system 130 receives interaction data from a user interaction comprising a digital audio signal. The entity may receive interaction data at a portal such as an endpoint device at a customer service center. When a user associated with the entity is connected with another user (such as a user who purports to be a human, e.g., an "interacting user") through such portals, the system 130 receives a communication signal such as a digital audio signal. In other words, an audio capturing engine of the system 130 may be positioned between the user associated with the entity and the interacting user, configured to receive and store the audio signal. In some embodiments, the audio signal is a digital audio signal, and as such the digital audio signal may be structured to be processed by a digital signal processing engine of the system 130. In other embodiments, the audio signal may be analog, and as such the analog signal is routed to a digital audio converter to convert the analog audio signal into a digital audio signal for purposes of further digital signal processing by the digital signal processing engine of the system 130.

Next, in block 304, the system 130 may capture a first audio segment and a second audio segment of the digital audio signal. As previously described, the system 130 continuously receives the digital audio signal. The digital audio signal may then be saved to the storage device 106 of the system 130. Thereafter, the system 130 partitions e.g., slices the audio signal into two separate segments: a first segment and a second segment. In some embodiments, the system 130 provides the interacting user with an audio prompt, such as "please say what month it is." Subsequently, in some embodiments the system 130 then denotes the timestamp of the digital audio signal at the point at which the system 130 finishes providing a first prompt. In other embodiments, the system 130 triggers a recording engine to record the digital audio signal immediately after the first prompt has been given to the interacting user by the system 130. In other words, the system 130 may capture a response to the first prompt in real time via a recording engine and save in the storage device 106 the interacting user's response to the first prompt. In other embodiments, the system 130 may refer to the stored digital audio signal in the storage device 106, reference the timestamp of the ending of the first prompt, and retrieve a first audio segment for a predetermined amount of time subsequent to timestamp of the ending of the first prompt.

In some embodiments, the system 130 may then subsequently provide the interacting user with a second prompt which is identical to the first prompt, such as to receive first and second audio segments of two sample pronunciations of the same word or phrase. In this way, and as will be described in detail herein, the system 130 may identify if there is natural variation in the two responses to the two identical prompts. Subsequently, in some embodiments the system 130 then denotes the timestamp of the digital signal at the point at which the system 130 finishes providing a second prompt. In other embodiments, the system 130 triggers a recording engine to record the digital audio signal immediately after the second prompt has been given to the interacting user by the system 130. In other words, the system 130 may capture a response to the second prompt in real time via a recording engine and save in the storage device 106 the interacting user's response to the second prompt. Or in other embodiments the system 130 may refer to the stored digital audio signal in the storage device 106, reference the timestamp of the ending of the second prompt, and retrieve a second audio segment for a predetermined amount of time subsequent to timestamp of the ending of the second prompt.

In some embodiments, instead of the system 130 providing first and second prompts to the interacting user, the system 130 may continuously analyze spoken words provided by the interacting user to the system 130 through the digital audio signal and identify two words that are identical to each other. For example, an interacting user may be conversing e.g., interacting with a user associated with the entity and say, "I would like to know the balance of my account please, and the account is listed under my name." In such an interaction, the interacting user uses the word "account" twice. For purposes of this example, each instance of the word "account" will be identified and used by the system 130 as the first and second audio segments. As the system 130 receives the digital audio signal, the system 130 may identify, separate, and store samples (e.g., segments) of each word spoken by the interacting user in the storage device 106 of the system 130. To do so, the system 130 may utilize a language processing engine to receive the digital audio signal, in real time or as stored in a buffer, and utilize a natural language processing portion of the language processing engine to identify words in a predetermined language, and thus identify breaks between each word. Put differently, the first and second segments may be captured in real-time from a singular audio source. The system 130 may then tag the timestamps of the digital audio signal corresponding to the beginning and end of each word. Thereafter, the system 130 may split the digital audio signal into segments, each segment corresponding to a single word.

Thereafter, the system 130 may store in a database of the storage device 106, each segment, and/or a reference to each segment and a reference to a corresponding file containing text of each word identified by the language processing engine. They system 130 may then, at a predetermined interval, compare the text of each word determined during an interaction to identify duplicates using a duplicate identification function. The system 130 may perform this comparison and identification of duplicates in a first-in-first-out ("FIFO") order, such that the words received earliest in the interaction are those that are evaluated first by the system 130 for duplicates. In this way, the system 130 can rapidly identify first and second audio segments of the same word before the interaction has been ongoing for an unnecessarily extended length of time.

Once a duplicate word is identified from the files containing text of each word identified by the language processing system 130, the system 130 may then arbitrarily assign/identify one corresponding audio segment as the first audio segment, and a second corresponding audio segment as the second audio segment, for purposes of further evaluation as will be described herein.

In some embodiments, the first audio segment and the second audio segment are captures of spaces (e.g., pauses) between words, sentences, or phrases. In the same way that the language processing engine is used to identify words, the language processing engine may identify the spaces between such words, e.g., the pauses, gaps, or breaks between spoken sentences or words by the interacting user. As the system 130 receives the digital audio signal, the system 130 may identify, separate, and store samples (e.g., segments) of spaces between sentences or words of the interacting user in the storage device 106 of the system 130. To do so, the system 130 may utilize a language processing engine to receive the digital audio signal, in real time or as stored in a buffer, and utilize a natural language processing portion of the language processing engine to identify words in a given language, and thus identify breaks between each word. The system 130 may then tag the timestamps of the digital audio signal corresponding to the beginning and end of each break between words. Thereafter, the system 130 may split the digital audio signal into segments, each segment corresponding to a space between sentences or words. Thereafter, the system 130 may then store in a database, each segment.

Next, as illustrated by block 306, the system 130 may plot (e.g., graph) the first audio segment and the second audio segment into corresponding first and second plots, wherein a plot type of the first and second plots is at least one selected from group consisting of: time-domain waveforms, frequency-domain waveforms, and spectrograms. Each of the first and second audio segments may be analyzed by the system 130, wherein the system 130 contains a digital signal processing engine, which is an engine structured to receive the first and second audio segments and transform the first and second audio seconds into plots. Plots, e.g., graphs, as will be understood by one of ordinary skill in the art, are a visualization an audio signal. In some embodiments, the system 130 may generate a waveform, e.g., a time-domain waveform, where the plot displays time on the horizontal axis, and amplitude of the signal of the audio segment on the vertical axis. However, in other embodiments, the system 130 may generate a spectral plot, also referred to as a frequency-domain waveform, where the plot displays frequency on the horizontal axis and amplitude of the signal of the audio segment on the vertical axis. To create the spectral plots, e.g., the frequency-domain waveform, the system 130 implements a Fourier transform function that breaks the signal into spikes of different amplitudes and frequencies. In some embodiments, the system 130 may implement a short-time Fourier transform (STFT) function, which is a sequence of Fourier transforms converting a waveform into a spectrogram. In any embodiment, the processing which is applied to the first audio segment will be identical to that which is applied to the second audio segment.

It shall be understood that digital audio such as that of the first and second segments may be unstructured or structured data, and may be stored in various formats, including but not limited to uncompressed formats such as Waveform Audio File Format ("WAV" or "WAVE") or Audio Interchange File Format ("AIFF"), or compressed audio formats such as Free Lossless Audio Codec ("FLAC") or mpeg-1 audio layer 3 (MP3).

Additionally, or alternatively, in order to assist in the utilization of machine learning aspects of certain embodiments, as will be described in detail herein, the system 130 may generate a spectrogram, or in some embodiments a melody ("mel") spectrogram, as the first plot and as the second plot. In some embodiments, the spectrogram or mel spectrogram may be generated in addition to the time domain waveforms or frequency domain waveforms for each segment, such as the first and second plots for the first and second audio segments. In this way the spectrogram or mel spectrogram may be stored in a storage device 106 and identified/indexed as being associated with other plots corresponding to the same segment. A spectrogram is a detailed view of the audio segment that covers three characteristics of sound. The horizontal axis displays time, frequencies are displayed on the vertical axis, and amplitude is depicted from the color of the plot. The louder the audio segment, the brighter the color, while silence is represented by black. Accordingly, the system 130 may track how frequencies change over time, examine the sound in all its fullness, and spot various areas such as noises and patterns. In essence, each of the first and second segments will now have a corresponding "imprint" associated with the sounds therein.

The process may continue at block 308, where the system 130 compares the first and second plots. Since the plots for both the first and second audio segments have been generated and/or pre-processed identically, the corresponding plots for the first and second audio segments may be compared. The comparison involves computing a mathematical difference between the first plot and the second plot in order to form a "difference plot." In other words, for each point along the curves of the first plot, or for points at a predetermined horizontal axis interval, the system 130 identifies a location on the second plot of equal value along the horizontal axis (e.g., either the same time or the same frequency) and subtracts the two to form a difference plot. Since the difference may be a positive or negative value depending on whether the first plot is subtracted from the second plot, or vice versa, in some embodiments the system 130 may compute the absolute value of the difference, such that the difference is always a positive value, and form the difference plot based on the absolute value in the vertical axis.

The process may continue at block 310 wherein the system 130 determines a quantity of outlier peaks. It shall be appreciated that if the difference plot is mostly a flat line (e.g., a difference of zero, or close to zero, between the first plot and a second plot for each interval on the horizontal axis) this is an indication that the first audio segment and the second audio segment are substantially similar to one another. Accordingly, there is a high likelihood that the interacting user is an artificial user (e.g., using artificial intelligence and/or text-to-speech systems to interact with the entity), since natural human voices tend to pronounce identical words with slight variations each time. In the embodiments where the first and second audio segments are captures of spaces between words, sentences, or phrases, the same contention holds true, since artificial voices rarely contain background noise, intermittent biological noises, or the like.

First, the local peaks of the difference plot are identified. Local peaks of the curves within the difference plot can be found through numerous methods including, but not limited to, obtaining the first derivative of the difference plot and indicating where the first derivative is equal to zero in value. In some embodiments, prior to the determination of the local peaks, the system 130 may smooth the data (e.g., pre-process the data) to reduce noise such as though Savitzky-Golay algorithm or least squares curve fitting. In this way, noise in the data will not disturb the calculation of the first derivatives, thus improving the detection of the local peaks.

Second, based on a predetermined threshold set by user, the system 130 calculates how many of the local peaks are below or above the predetermined threshold. These local peaks will be referred to as "outlier peaks" such that they represent an irregularity between the audio of the first audio segment and the second audio segment. In other words, the higher the number of irregularities, the more likely it is that the interacting user is a human.

Accordingly, at block 312, the system 130 may assign an artificial user probability (e.g., a likelihood that the interacting user is artificial, such as using a text-to-speech generator or artificial intelligence) to the user interaction. In some embodiments, the artificial user probability is low if the quantity of outlier peaks is greater than a predetermined outlier peak threshold. Similarly, the artificial user probability is high if the quantity of outlier peaks is less than the predetermined outlier peak threshold.

Thus, the process may continue at block 314, wherein the system 130 displays the artificial user probability on a user interface of an endpoint device 140. The system 130 may transmit a notification, the notification containing alphanumeric and/or color-coded text such as "human" or "artificial" to indicate to the user a probability of the interacting user being a human or artificial, respectively. Thus, the notification may be displayed on the user interface e.g., a GUI, of the endpoint device 140 of the user associated with the entity. Thereafter, the user associated with the entity may either terminate the call or alert managers for further analysis.

FIG. 4 illustrates a process flow 400 for digital voice data processing and authentication, in accordance with an embodiment of the invention. In some embodiments, a machine learning subsystem 200 may be utilized to increase the efficiency of the processing of the first and second audio segments, and thus increase the efficiency of notifying users associated with the entity of artificial users. The processes illustrated in blocks 402 and 404 are identical to blocks 302 and 304 of FIG. 3. Instead of performing the steps outlined in blocks 306 through 312 e.g., the generation, comparison, and analysis of plots, upon identification and separation of each audio segment, the system 130 as illustrated in block 406 plots a spectrogram for each of the first audio segment and the second audio segment. In block 408, the machine learning subsystem 200 is queried and performs an analysis of the spectrograms for the first audio segment and/or the second audio segment. The machine learning subsystem 200 is queried, based on training data 218 provided to the machine learning subsystem 200, whether the instant spectrogram(s) is identical to those spectrograms the machine learning subsystem 200 has received as training data 218 identified as being associated with an artificial user.

Accordingly, based on prior interactions determined in block 312 of FIG. 3, at least one of a spectrogram of the first audio segment and a spectrogram of the second audio segment is transmitted to a machine learning subsystem 200 as training data 218. It is to be understood that when an artificial user forms words digitally, the audio segment that is captured by the system 130 during any given interaction would be similar, if not identical, to the audio segment captured in future interactions. In other words, the malfeasant actors disguised as interacting users may use the same artificial intelligence and/or text-to-speech engine numerous additional times, or other interacting users may use the same artificial intelligence and/or text-to-speech engine due to its commercial availability and/or popularity. By providing the machine learning subsystem 200 training data 218 after every interaction that yields an indication of an artificial user, the series of analysis steps in the instant interaction may be circumvented and either (i) the interaction is automatically terminated, or (ii) the process continues at block 314 where a user is alerted of the likelihood of the interacting user being an artificial user.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for digital voice data processing and authentication, the system comprising:

at least one non-transitory storage device; and at least one processing device coupled to the at least one non-transitory storage device, wherein the at least one processing device is configured to:

receive a user interaction comprising a digital audio signal;

capture a first audio segment and a second audio segment of the digital audio signal continuously, in real time, from a singular audio source, wherein the second audio segment is subsequent the first audio segment, wherein the first audio segment corresponds to a first instance of a word and the second audio segment corresponds to a second instance of the word, wherein a natural language processing engine identifies the first audio segment and the second audio segment as two instances of the same word from text of the first audio segment and the second audio segment, and wherein the natural language processing engine identifies word boundaries of the first audio segment and the second audio segment by tagging timestamps of the digital audio signal corresponding to the beginning and end of each word;

plot the first audio segment and the second audio segment into corresponding first and second plots, wherein the first plot comprises a first curve comprising a first plurality of points, wherein the second plot comprises a second curve comprising a second plurality of points, and wherein a plot type of the first and second plots is a spectrogram;

compare the first and second plots, wherein comparing comprises subtracting each point of the first plurality of points of the first curve from a corresponding point of the second plurality of points of the second curve at corresponding horizontal axis locations to form a difference plot;

determine a quantity of outlier peaks, wherein the outlier peaks comprise peaks of the difference plot above an upper predetermined threshold or below a lower predetermined threshold;

assign an artificial user probability to the user interaction, wherein the artificial user probability is low if the quantity of outlier peaks is greater than a predetermined outlier peak threshold; and display the artificial user probability on a user interface of an endpoint device.

2. The system of claim 1, wherein the first audio segment is received subsequent a first word prompt provided to a user, wherein the second audio segment is provided in response to a second word prompt provided to a user, and wherein the first word prompt and the second word prompts are identical.

3. The system of claim 1, wherein the first audio segment and the second audio segment are captures of space between words, wherein the space between words is related to auditory cadence captured in the first and second audio segments.

4. The system of claim 1, wherein if the artificial user probability is high, at least one of a spectrogram of the first audio segment and a spectrogram of the second audio segment is transmitted to a machine learning subsystem as training data.

5. The system of claim 4, wherein the at least one processing device is further configured to:

query the machine learning subsystem, prior to comparing the first and second plots, to determine if the spectrogram is identical to a known spectrogram; and terminate the user interaction if the spectrogram is identical.

6. A computer program product for digital voice data processing and authentication, the computer program product comprising a non-transitory computer-readable medium comprising code causing a first apparatus to:

receive a user interaction comprising a digital audio signal;

capture a first audio segment and a second audio segment of the digital audio signal continuously, in real time, from a singular audio source, wherein the second audio segment is subsequent the first audio segment, wherein the first audio segment corresponds to a first instance of a word and the second audio segment corresponds to a second instance of the word, wherein a natural language processing engine identifies the first audio segment and the second audio segment as two instances of the same word from text of the first audio segment and the second audio segment, and wherein the natural language processing engine identifies word boundaries of the first audio segment and the second audio segment by tagging timestamps of the digital audio signal corresponding to the beginning and end of each word;

plot the first audio segment and the second audio segment into corresponding first and second plots, wherein the first plot comprises a first curve comprising a first plurality of points, wherein the second plot comprises a second curve comprising a second plurality of points, and wherein a plot type of the first and second plots is a spectrogram;

compare the first and second plots, wherein comparing comprises subtracting each point of the first plurality of points of the first curve from a corresponding point of the second plurality of points of the second curve at corresponding horizontal axis locations to form a difference plot;

determine a quantity of outlier peaks, wherein the outlier peaks comprise peaks of the difference plot above an upper predetermined threshold or below a lower predetermined threshold;

assign an artificial user probability to the user interaction, wherein the artificial user probability is low if the quantity of outlier peaks is greater than a predetermined outlier peak threshold; and display the artificial user probability on a user interface of an endpoint device.

7. The computer program product of claim 6, wherein the first audio segment is received subsequent a first word prompt provided to a user, wherein the second audio segment is provided in response to a second word prompt provided to a user, and wherein the first word prompt and the second word prompts are identical.

8. The computer program product of claim 6, wherein the first audio segment and the second audio segment are captures of space between words, wherein the space between words is related to auditory cadence captured in the first and second audio segments.

9. The computer program product of claim 6, wherein if the artificial user probability is high, at least one of a spectrogram of the first audio segment and a spectrogram of the second audio segment is transmitted to a machine learning subsystem as training data.

10. The computer program product of claim 9, wherein the code further causes a first apparatus to:

query the machine learning subsystem, prior to comparing the first and second plots, to determine if the spectrogram is identical to a known spectrogram; and terminate the user interaction if the spectrogram is identical.

11. A method for digital voice data processing and authentication, the method comprising:

receiving a user interaction comprising a digital audio signal;

capturing a first audio segment and a second audio segment of the digital audio signal continuously, in real time, from a singular audio source, wherein the second audio segment is subsequent the first audio segment, wherein the first audio segment corresponds to a first instance of a word and the second audio segment corresponds to a second instance of the word, wherein a natural language processing engine identifies the first audio segment and the second audio segment as two instances of the same word from text of the first audio segment and the second audio segment, and wherein the natural language processing engine identifies word boundaries of the first audio segment and the second audio segment by tagging timestamps of the digital audio signal corresponding to the beginning and end of each word;

plotting the first audio segment and the second audio segment into corresponding first and second plots, wherein the first plot comprises a first curve comprising a first plurality of points, wherein the second plot comprises a second curve comprising a second plurality of points, and wherein a plot type of the first and second plots is a spectrogram;

comparing the first and second plots, wherein comparing comprises subtracting each point of the first plurality of points of the first curve from a corresponding point of the second plurality of points of the second curve at corresponding horizontal axis locations to form a difference plot;

determining a quantity of outlier peaks, wherein the outlier peaks comprise peaks of the difference plot above an upper predetermined threshold or below a lower predetermined threshold;

assigning an artificial user probability to the user interaction, wherein the artificial user probability is low if the quantity of outlier peaks is greater than a predetermined outlier peak threshold; and displaying the artificial user probability on a user interface of an endpoint device.

12. The method of claim 11, wherein the first audio segment is received subsequent a first word prompt provided to a user, wherein the second audio segment is provided in response to a second word prompt provided to a user, and wherein the first word prompt and the second word prompts are identical.

13. The method of claim 11, wherein the first audio segment and the second audio segment are captures of space between words, wherein the space between words is related to auditory cadence captured in the first and second audio segments.

14. The method of claim 11, wherein if the artificial user probability is high, at least one of a spectrogram of the first audio segment and a spectrogram of the second audio segment is transmitted to a machine learning subsystem as training data.

15. The method of claim 14, wherein the method further comprises:

querying a machine learning subsystem, prior to comparing the first and second plots, to determine if the spectrogram is identical to a known spectrogram; and terminating the user interaction if the spectrogram is identical.

* * * * *